June 25, 1957  E. G. BROOKS  2,797,126
WIND VANE ATTACHMENT FOR PIVOTED VENTILATOR
WINDOWS OF AUTOMOBILES
Filed March 7, 1955

INVENTOR
EUGENE G. BROOKS

BY

*Young & Wright*

ATTORNEYS

United States Patent Office 2,797,126
Patented June 25, 1957

2,797,126

WIND VANE ATTACHMENT FOR PIVOTED VENTILATOR WINDOWS OF AUTOMOBILES

Eugene G. Brooks, Waukesha, Wis.

Application March 7, 1955, Serial No. 492,618

2 Claims. (Cl. 296—44)

This invention appertains to attachments for automotive vehicles and more particularly to a wind deflecting attachment for the front side ventilating wing of the automobile. In conventional model cars, each front side portion broadly includes a window opening which is closed by a vertically movable window and a forward pivotal wind wing. The wind wing is capable of many positions and is utilized to deflect the wind from blowing directly on the driver or into the interior of the car. However, when moving at relatively high speeds it is very difficult to prevent the wind from blowing directly on the driver when the vertically movable window is lowered and regardless of the position of the pivotal wind wing.

It is therefore a primary object of my invention to provide a vane attachment for the trailing edge of the pivotal wind wing to form an extension thereof and to effectively prevent the wind from blowing directly on the driver or into the back compartment of the automobile.

A further important object of my invention is to provide a vane attachment which may be quickly and easily secured to the wind wing and which may be just as easily removed therefrom.

Another important object of my present invention is to provide a novel hinge arrangement which not only provides pivotal adjustment for the vane but is so arranged that when the wind wing is in its closed position, unauthorized removal of the attaching vane is prevented.

Still another object of my invention is to provide a wind vane attachment which is adapted to fit all types and makes of automobiles.

A still further object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which.

Figure 1:
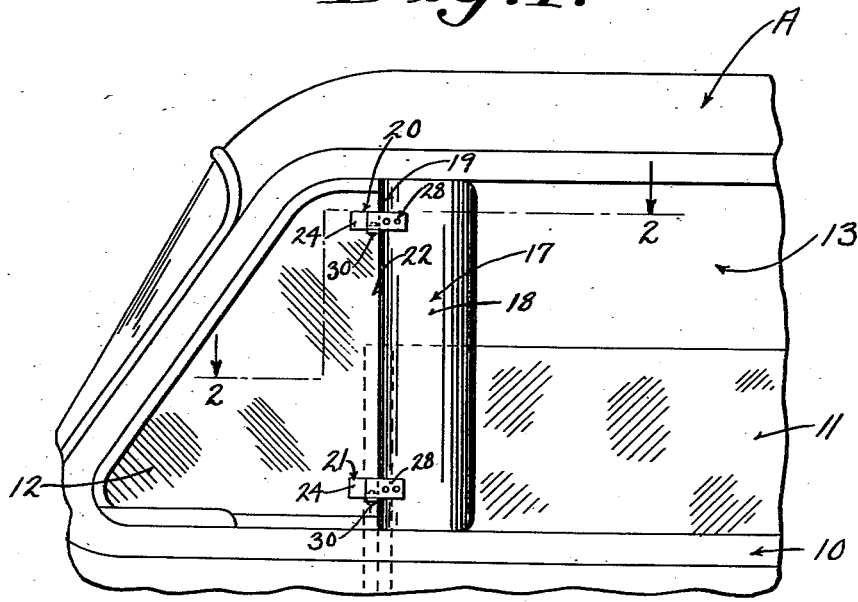
Figure 1 is a fragmentary side view of the front side window area of an automobile showing the preferred embodiment of my invention attached thereto.

Referring now to the drawing in detail wherein similar reference characters designate corresponding parts throughout the several views, the letter A generally refers to a conventional automobile construction and each front side door 10 is provided with a vertically movable window 11 and a pivotal wind wing 12 serving in conjunction with the window 11 to close the window opening 13.

Figure 2:
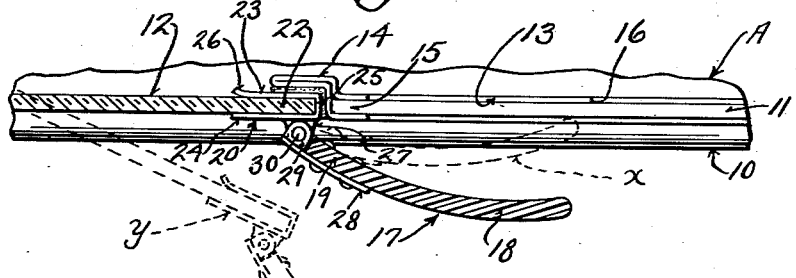
Figure 2 is a fragmentary plan sectional view taken on the line 2—2 of Figure 1 and looking in the direction of the arrows.

The vertically movable window 11 usually is provided with a rail 14 at its forward edge 15 against which the wind wing 12 seals when closed (full lines, Figure 2). The window 11 together with its rail 14 is movable vertically into and out of a well 16 formed in the door 10. Obviously, in use the window 11 can be raised and lowered as desired and the wind wing 12 may be swung on its pivot to any one of many positions, some of which while affording a wind break or shield for the front compartment of the auto, do not suitably shield the driver or the back compartment when the window 11 is down.

Further, at high speeds it is sometimes impossible to utilize the wind wing at all when the window 11 is opened. Accordingly, my invention is designed primarily to provide a vane attachment 17 so mounted in the window opening as to provide a suitable shield for the driver and the back compartment regardless of the speed of the vehicle.

The vane attachment includes, broadly, a preferably transparent plastic sheet 18 of generally rectangular shape provided at its forward edge 19 with a hinged clip 20 adjacent the top thereof and with a similarly formed hinge 21 adjacent the lower portion thereof. The spring clips 20 and 21 may be readily and detachably secured to the trailing edge 22 of the pivotal wind wing 12 and it is of course obvious that the vane 17 may be pivoted into a number of positions in relation to the wind wing 12.

Figure 3:
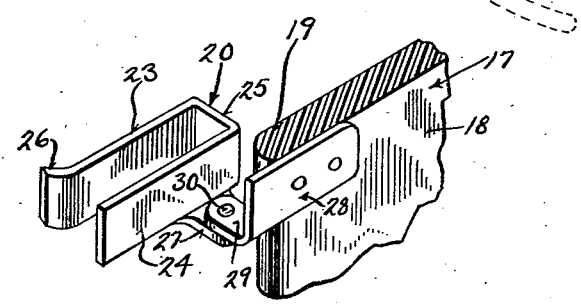
Figure 3 is an enlarged fragmentary detailed plan view showing in particular the novel hinge arrangement of the vane.

An important feature of my invention resides in the novel construction and arrangement of the spring clips 20 and 21. The clips are identical and referring now to Figure 3 of the drawings, it can be seen that the clip 20 includes the parallel spring legs 23 and 24 respectively, joined at one end by the piece 25 to form a U-shaped spring attachment. One leg 23 may be off-set at its forward end 26 as shown so that the spring legs 23 and 24 respectively may be easily separated and moved over the trailing edge 22. The other leg 24 of the spring clip 20 is provided with an outwardly projecting lug 27.

I also provide a bracket 28 which is riveted or otherwise secured to the transparent sheet 18 and which is provided with a laterally extending lug 29 adapted to overlap the lug 27 of the clip 20. Both lugs 27 and 29 are provided with an aligned hole to receive the pivot pin 30, and it is to be particularly noted that this arrangement positions the clip 20 in an off-set arrangement with the vane 18 so that when the wind wing 12 is in its closed sealing position, as in the full lines of Figure 2, the upper clip 20 and its identically formed lower clip 21 will be firmly held by the off-set rail 14 so that the attachment 17 can not be removed by unauthorized persons. It should also be noted that in the preferred form of my invention the substantially rectangular shaped sheet 18 is curved inwardly throughout its entire length to provide a smooth flow of air regardless of the position of the sheet.

With the use of my novel attachment 17, it is possible for a car travelling at high speeds with the window 11 in the position illustrated in Figures 1 and 2 of the drawings, to afford the driver protection from direct draft. When travelling at such speeds it is preferable that the vane attachment 17 be in its full-line position of Figure 2 of the drawings and if desired, when the car comes to a halt or when the window is entirely closed, it may be moved inwardly to its dotted line position "X" of Figure 2 where it will fit snugly against the window 11 and lie in an out-of-the-way position. At normal driving speeds, however, the wind vane 12 may be pivoted to the dotted line position "Y" of Figure 2 and the driver and back compartment of the automobile will be suitably shielded from a direct draft.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. In a vehicle body having a door and a side pivoted wind deflecting wing on said door and a window movable vertically up and down adjacent said deflecting wing, a wind vane of an elongated substantially rectangular shaped transparent sheet having upper and lower aligned hinges secured to its leading edge, and a pair of spring clips, each clip secured to a respective hinge and adapted to receive the trailing edge of said pivoted wing, said spring clips being offset from said transparent sheet so that the vane cannot be removed when said pivoted wing is in its closed and sealed position adjacent said window.

2. In combination with a vehicle body having a door, a side pivoted wind deflecting wing, a vertically slidable window adjacent said pivoted wing, a wind vane, said wind vane comprising an elongated substantially rectangular shaped transparent sheet having upper and lower aligned hinges secured to its leading edge, and a pair of spring clips, each clip secured to a respective hinge and adapted to receive the trailing edge of said pivoted wing and being offset from said transparent sheet, said transparent sheet being curved inwardly from its leading edge to its trailing edge.

References Cited in the file of this patent

UNITED STATES PATENTS

| | | |
|---|---|---|
| 1,443,713 | Maulding | Jan. 30, 1923 |
| 2,135,215 | Normandin | Nov. 1, 1938 |
| 2,141,442 | Mead | Dec. 27, 1938 |
| 2,513,744 | Rawson | July 4, 1950 |
| 2,586,090 | Riggs | Feb. 19, 1952 |
| 2,608,926 | Helsley | Sept. 2, 1952 |

FOREIGN PATENTS

| | | |
|---|---|---|
| 168,512 | Great Britain | Sept. 8, 1921 |